(12) United States Patent
Rimmington (10) Patent No.: US 10,214,360 B1
(45) Date of Patent: Feb. 26, 2019

(54) CHAIN CONVEYOR AND DRIVE SPROCKET FOR SAME

(71) Applicant: Joy MM Delaware, Inc., Wilmington, DE (US)

(72) Inventor: Gareth Rimmington, Barnsley (GB)

(73) Assignee: Joy Global Underground Mining LLC, Warrendale, PA (US)

( * ) Notice: Subject to any disclaimer, the term of this patent is extended or adjusted under 35 U.S.C. 154(b) by 0 days.

(21) Appl. No.: 15/669,176

(22) Filed: Aug. 4, 2017

(51) Int. Cl.
| | |
|---|---|
| *B65G 17/06* | (2006.01) |
| *B65G 17/42* | (2006.01) |
| *B65G 23/06* | (2006.01) |
| *E21F 13/06* | (2006.01) |
| *E21C 27/02* | (2006.01) |
| *E21C 25/16* | (2006.01) |

(52) U.S. Cl.
CPC .......... *B65G 17/063* (2013.01); *B65G 17/42* (2013.01); *B65G 23/06* (2013.01); *E21C 27/02* (2013.01); *E21F 13/066* (2013.01); *B65G 2201/045* (2013.01); *B65G 2812/02287* (2013.01); *B65G 2812/02376* (2013.01); *E21C 25/16* (2013.01)

(58) Field of Classification Search
CPC ......... B65G 19/22; B65G 19/24; B65G 19/26
USPC ...................... 198/717, 725–735.6
See application file for complete search history.

(56) References Cited

U.S. PATENT DOCUMENTS

| | | | |
|---|---|---|---|
| 1,841,925 A | 1/1932 | Woodbury | |
| 2,590,802 A * | 3/1952 | Tramblay | B65G 19/10 198/735.6 |
| 2,717,548 A | 9/1955 | Blair | |
| 3,522,875 A * | 8/1970 | Collier et al. | B65G 19/24 198/728 |
| 3,610,474 A * | 10/1971 | Usher et al. | A01C 17/00 222/626 |
| 3,927,759 A * | 12/1975 | Hyler et al. | B65G 19/22 198/719 |
| 4,685,557 A | 8/1987 | Roinestad | |
| 4,747,481 A * | 5/1988 | Gorlov et al. | B65G 19/26 198/731 |
| 5,000,310 A * | 3/1991 | Edmondson | B65G 19/24 198/731 |
| 5,301,796 A * | 4/1994 | Rautio | B65G 17/26 198/817 |
| 5,427,580 A | 6/1995 | Ledvina et al. | |
| 6,719,127 B2 | 4/2004 | Depaso et al. | |
| 8,424,676 B2 | 4/2013 | Jones et al. | |
| 9,045,287 B2 | 6/2015 | Miller et al. | |
| 2005/0209033 A1 | 9/2005 | Ledvina et al. | |

FOREIGN PATENT DOCUMENTS

WO    2007092843 A2    8/2007

* cited by examiner

*Primary Examiner* — William R Harp
(74) *Attorney, Agent, or Firm* — Michael Best & Friedrich LLP (57) ABSTRACT

A conveyor assembly for moving material includes a plurality of chains each defining a longitudinal axis, and a plurality of flights coupled to the at least two chains and configured to contact and move the material in a direction parallel to the longitudinal axes. Each of the plurality of flights extends along a central axis oriented oblique with respect to the longitudinal axes. Each flight includes a first portion offset from a second portion in a direction parallel to the longitudinal axes.

21 Claims, 10 Drawing Sheets

CHAIN CONVEYOR AND DRIVE SPROCKET FOR SAME

FIELD OF DISCLOSURE

The present disclosure relates to conveyor systems, and particularly to a conveyor including flight bars (e.g., for a longwall mining system).

SUMMARY

Mining systems, such as longwall mining systems, include one or more shearers having cutting drums for cutting material from a mine face. In some embodiments, the material is deposited on an armored face conveyor (AFC) and carried away from the mine face.

In one aspect, a conveyor system configured to move material relative to a mine face includes a conveyor pan configured to support the material, a drive unit including a drive shaft and a plurality of sprockets secured to the drive shaft, the drive shaft driven about a rotational axis, and a conveying element including a plurality of chains and a plurality of flights. Each of the chains are driven by one of the sprockets to move the chain and the flights over the conveyor pan. Each of the flights is coupled between the plurality of chains. Each of the plurality of flights includes a first portion and a second portion. The first portion is coupled to the second portion by a movable joint, and the flights are configured to move the material over the conveyor pan.

In another aspect, a conveyor assembly for moving material including at least two chains, and a plurality of flights. Each of the plurality of flights includes a first portion coupled to a second portion by a movable joint. The first portion is fixedly coupled to one of the at least two chains. The second portion extends between the at least two chains. The plurality of flights is configured to contact and move the material.

In yet another aspect, a conveyor assembly for moving material includes at least two chains each defining a longitudinal axis, and a plurality of flights coupled to the at least two chains and configured to contact and move the material in a direction parallel to the longitudinal axes. Each of the plurality of flights extends along a central axis oriented oblique with respect to the longitudinal axes. Each flight includes a first portion offset from a second portion in a direction parallel to the longitudinal axes.

Other aspects will become apparent by consideration of the detailed description and accompanying drawings.

DETAILED DESCRIPTION

Before any embodiments of the disclosure are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Figure 1:
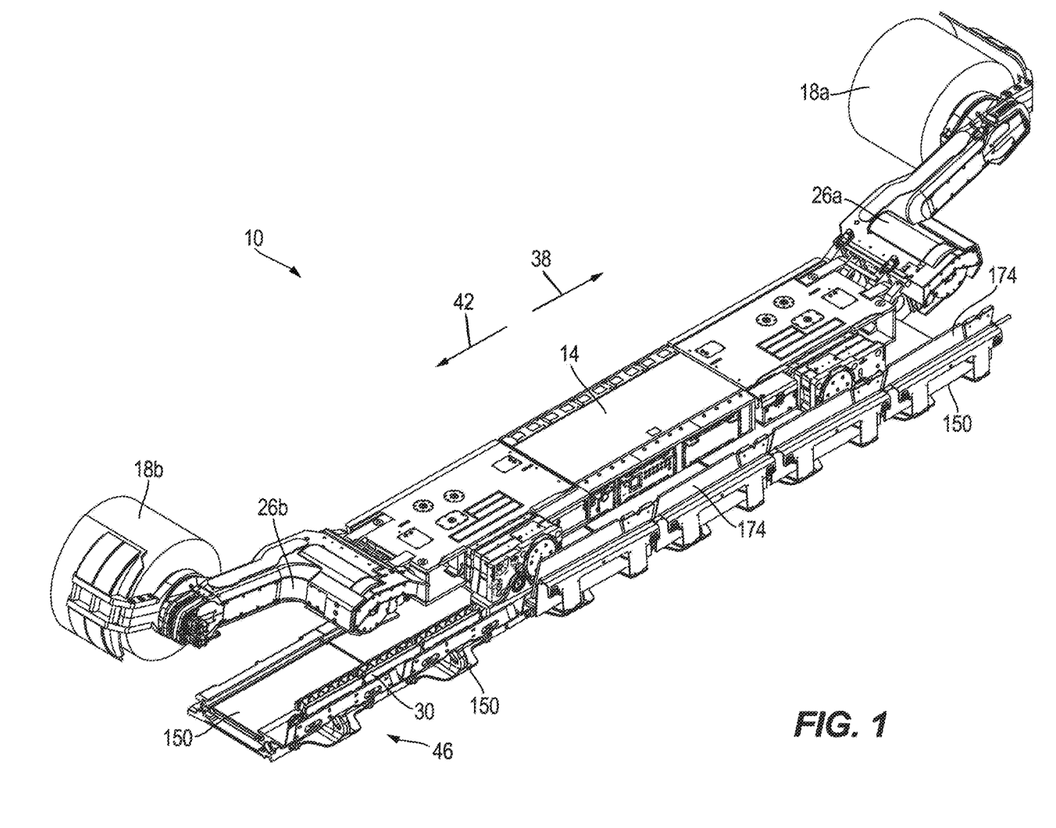
FIG. 1 is a perspective view of a mining machine.

FIG. 1 illustrates a mining machine, such as a longwall shearer 10, including a frame or chassis 14 and a pair of cutting heads 18 (i.e., first cutting head 18a and second cutting head 18b) having picks 22 (FIG. 2) with the cutting heads 18 coupled to the chassis 14 by ranging arms 26 (i.e., first ranging arm 26a and second ranging arm 26b). The chassis 14 is configured to move or tram along a rack 30 relative to a mine face 34 (FIG. 2) in a first direction 38 and a second direction 42 opposite the first direction 38. In one embodiment, the first cutting head 18a is elevated for the picks 22 to cut material (e.g., coal or other minerals) from an upper portion of the mine face 34, while the second cutting head 18b is in a lower position for the picks 22 to cut material from a lower portion of the mine face 34. The cut material is then deposited onto a conveyor assembly 46, described in more detail below.

Figure 2:
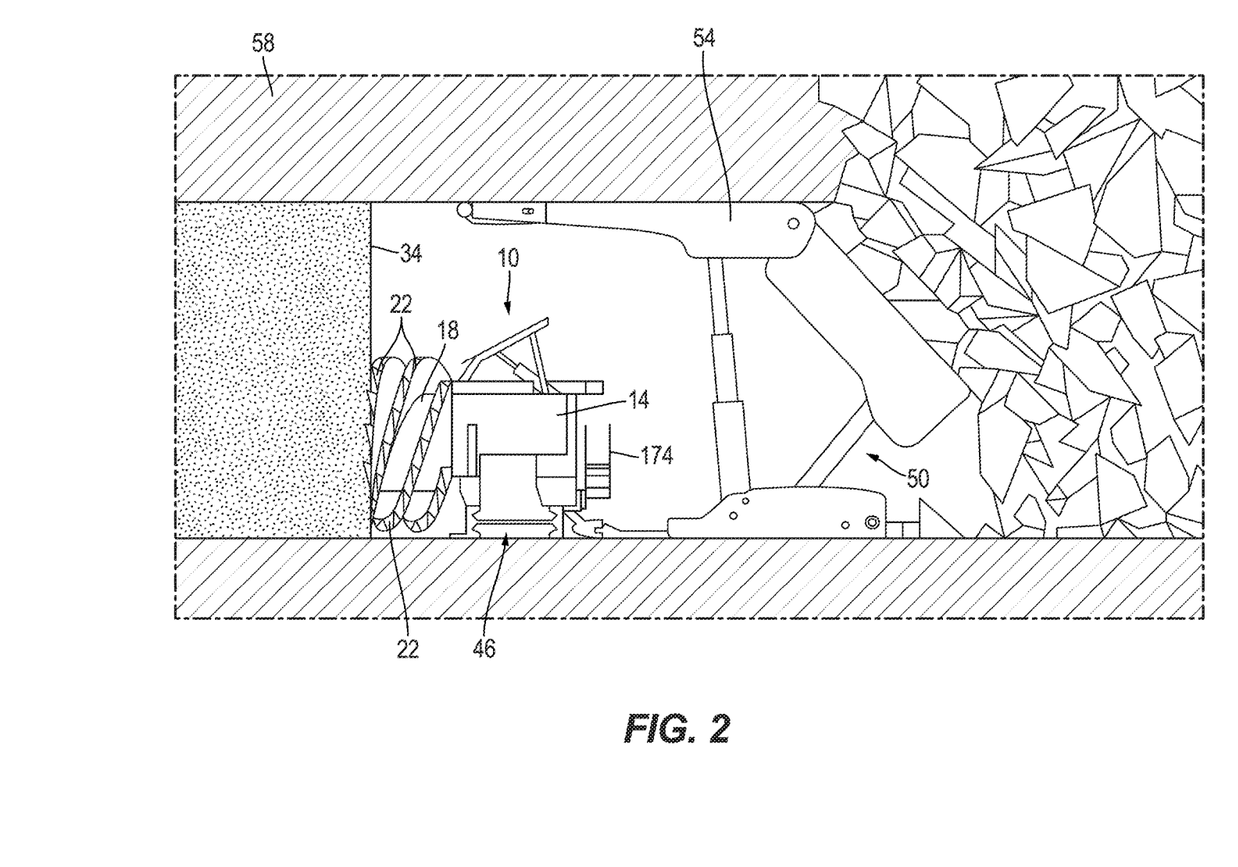
FIG. 2 is a side view of a roof support, a conveyor assembly, and the mining machine of FIG. 1.

As shown in FIG. 2, a portion of a longwall mining system is illustrated including the shearer 10, the conveyor assembly 46, and roof supports 50 that are operable to advance the shearer 10 and the conveyor assembly 46 toward the mine face 34. Each roof support 50 is positioned behind the conveyor assembly 46 (i.e., away from the mine face 34) and includes a shield 54 extending over the chassis 14 and the conveyor assembly 46 to engage a mine roof 58 (FIG. 3).

Figure 3:
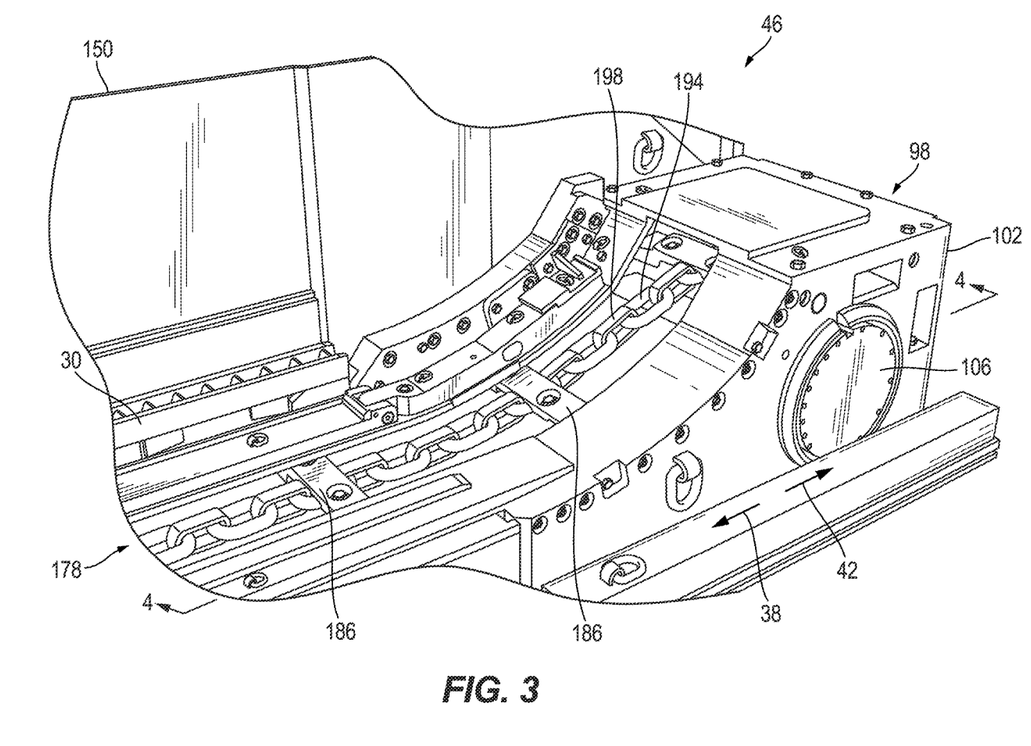
FIG. 3 is a perspective view of an end frame of the conveyor assembly of FIG. 2.
Figure 4:
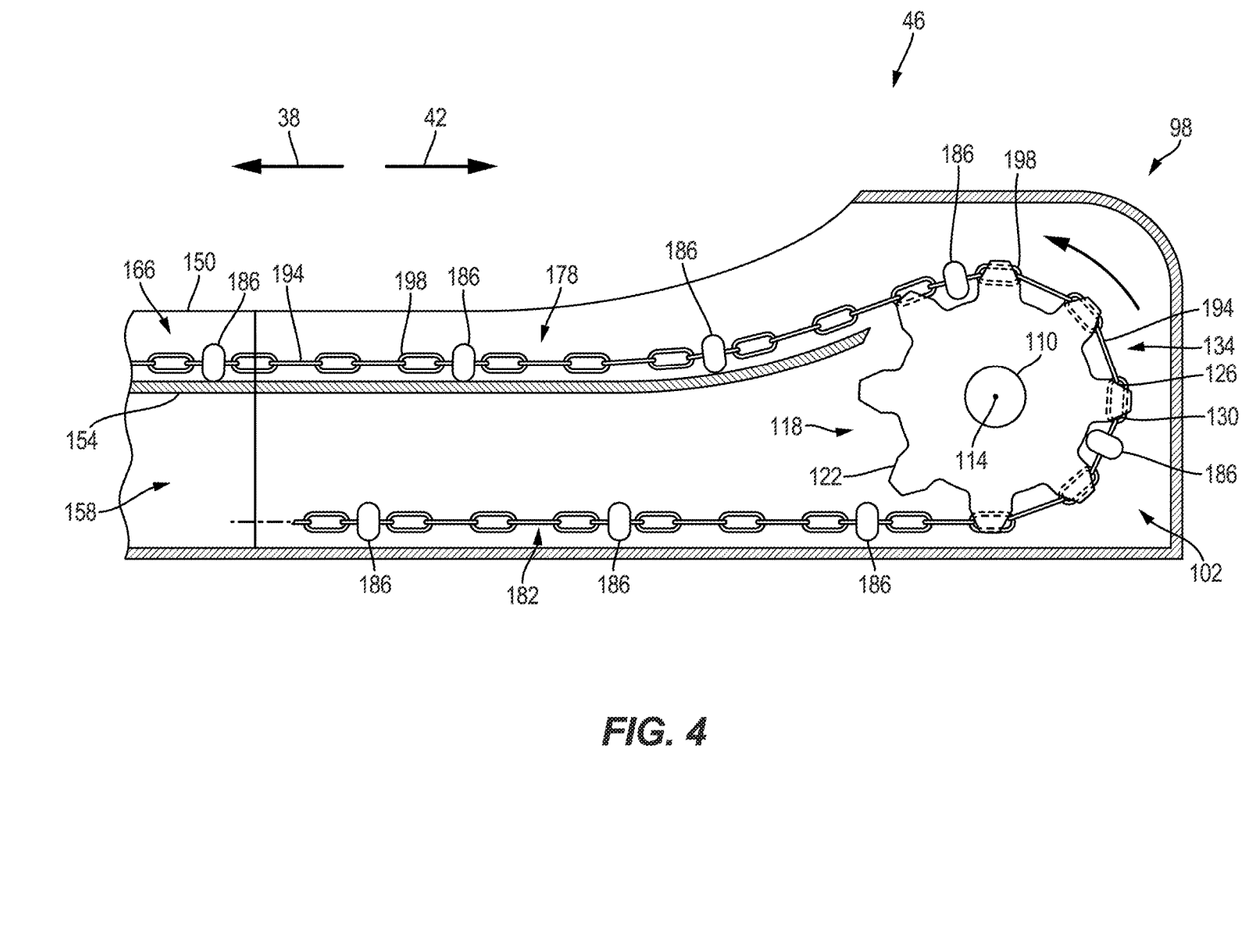
FIG. 4 is a section view of the end frame of FIG. 3, viewed along section 4-4.
Figure 5:
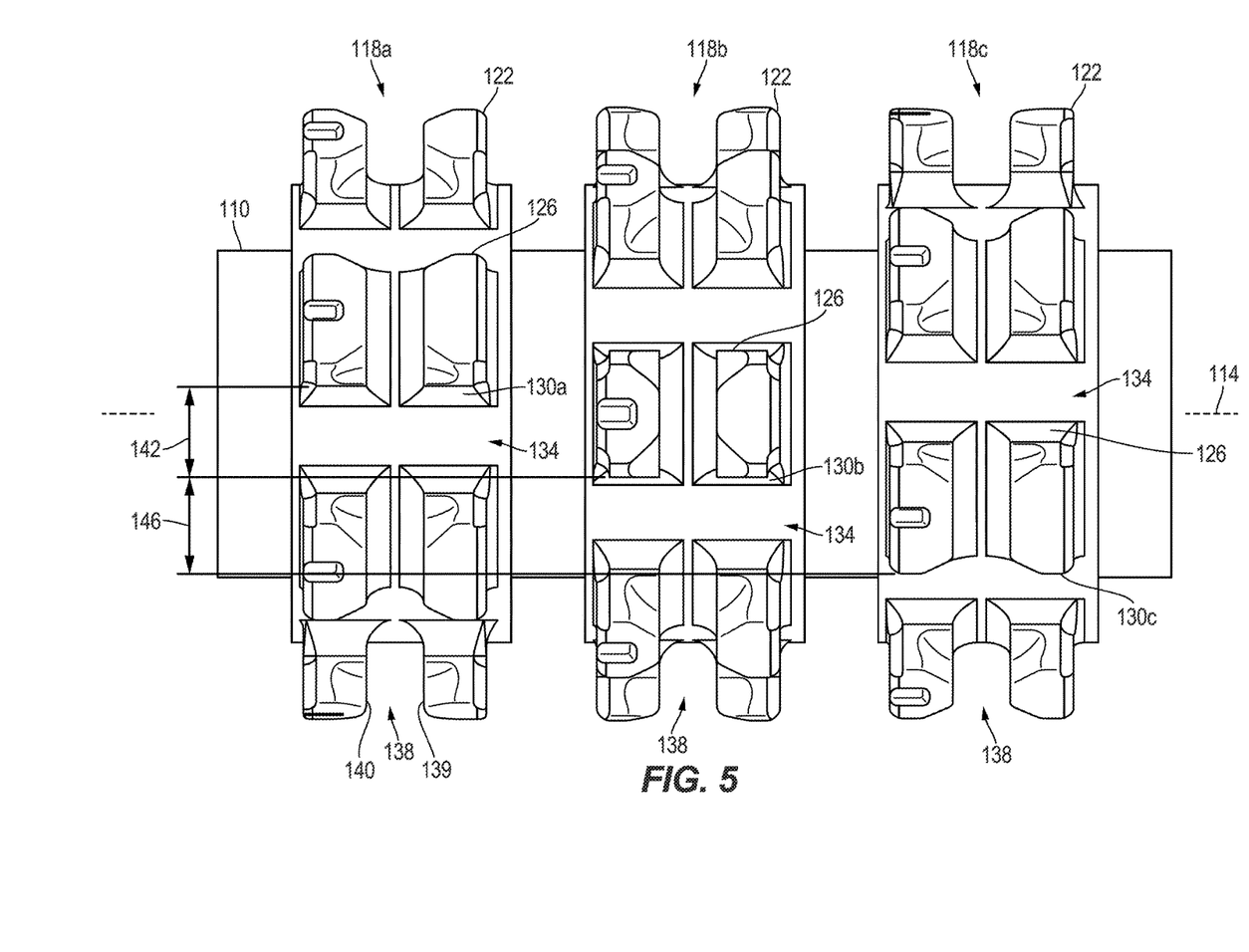
FIG. 5 is a schematic view of a portion of a drive unit of the end frame of FIG. 3 illustrating drive sprockets coupled to a drive shaft.

The illustrated conveyor assembly 46 also includes end frames 98 located at distal ends of the conveyor assembly 46 (only one end frame 98 is illustrated in FIGS. 3 and 4). With continued reference to FIGS. 3 and 4, each end frame 98 includes a drive unit 102 having a motor 106, a drive shaft 110 defining a rotational axis 114 that is perpendicular to the directions 38, 42, and a plurality of sprockets 118 rotatably fixed to the drive shaft 110. In one embodiment, the drive unit 102 includes three sprockets 118a, 118b, 118c (FIG. 5); in other embodiments, the drive unit 102 may include fewer or more sprockets 118. With reference to FIGS. 4 and 5, each sprocket 118 includes teeth or protrusions 122 radially extending away from the rotational axis 114.

As best shown in FIGS. 4 and 5, in the illustrated embodiment each protrusion is formed as a pair of protrusions 122 and includes a forward surface 126 facing toward a direction of rotation, and a rear surface 130 facing in the opposite direction. A first link slot 134 is formed between adjacent pairs of protrusions 122 in a peripheral direction of the drive shaft 110 about the rotational axis 114 so that the first link slots 134 form circumferential gaps between adjacent pairs of protrusions 122. In other words, each first link slot 134 is formed between a forward surface 126 of one pair of protrusions 122 and a rear surface 130 of an adjacent pair of protrusions 122 in the peripheral direction of the drive shaft 110 (FIGS. 4 and 5). Furthermore, a second link slot 138 is formed between a single pair of protrusions 122 (FIG. 5). In other words, each second link slot 138 is formed between a first inner surface 139 and a second inner surface 140, which faces the first inner surface 139, of a single pair of protrusions 122 (FIG. 5).

With continued reference to FIG. 5, each sprocket 118a-c is angularly offset about the rotational axis 114 relative to the other sprockets 118a-c. In particular, a first rear surface 130a of the pair of protrusions 122 of the first sprocket 118a is spaced from a second rear surface 130b of the pair of protrusions 122 of the second sprocket 118b by a first angle 142 (FIG. 9) in an angular direction about the rotational axis 114. Furthermore, the second rear surface 130b is spaced from a third rear surface 130c of the pair of protrusions 122 of the third sprocket 118c by a second angle 146 (FIG. 9) in the angular direction about the rotational axis 114. In one embodiment, the first angle 142 is the same as the second angle 146. In other embodiments, the first angle 142 may be greater than or less than the second angle 146. In further embodiments, the angle of offset (e.g., the first and second angles 142, 146) between the sprockets 118 is dependent upon the number of chains 182 being driven by the sprockets 118 and the number of protrusions 122 in each sprocket 118. In one embodiment, the angle of offset between the sprockets 118 may be calculated by:

$$\text{Angle of offset} = \frac{\left(\frac{360}{\text{number of protrusions 122 per sprocket 118}}\right)}{\text{number of chains 182}}$$

For example, in the illustrated embodiment of FIG. 5, each sprocket 118 includes seven protrusions 122 (or pairs of protrusions) and three chains 182 are driven, providing first and second angles 142, 146 of about 17 degrees.

Figure 6:
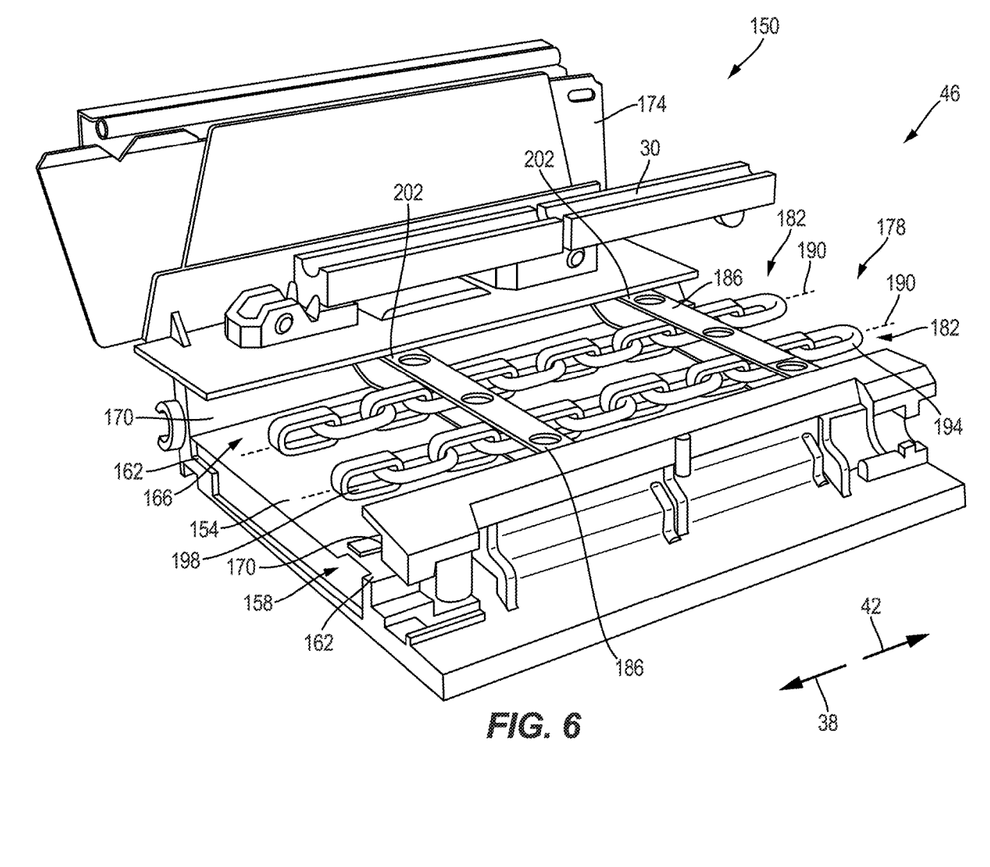
FIG. 6 is a perspective view of a portion of the conveyor assembly of FIG. 2.

With reference to FIG. 6, the conveyor assembly 46 also includes a conveyor pan 150 positioned between the two end frames 98. In some embodiments, the conveyor pan 150 is formed as multiple individual pan sections (only one pan section is illustrated in FIG. 6) that are interconnected with one another. The illustrated conveyor pan 150 includes a support plate 154 that defines a lower channel 158 having two opposed lower grooves 162 and an upper channel 166 having two opposed upper grooves 170. The lower channel 158 is a closed channel to inhibit cut material and/or debris from entering the lower channel 158, whereas the upper channel 166 is an open channel for receiving the cut material. In the illustrated embodiment, the conveyor pan 150 is coupled to the rack 30, and a spill plate 174 is positioned between the rack 30 and the roof support 50 (FIG. 2).

As shown in FIGS. 6, and 7A-7D, the conveyor assembly 46 further includes a conveying element 178 that is supported by the conveyor pan 150 and is driven by the two end frames 98. The illustrated conveying element 178 is a chain conveyor including at least two chains 182 and flight bars 186 (conventional flight bars are illustrated in FIG. 6) coupled between the chains 182 at regular intervals. In one embodiment, the flight bars 186 may be removeably coupled to the chains 182 (e.g., the flight bars 186 are bolted to the chains 182) to facilitate replacement of the flight bars 186. Each chain 182 defines a longitudinal axis 190 extending in a plane that is perpendicular to the rotational axis 114 of the end frames 98. In the illustrated embodiment, each chain 182 includes horizontal or first links 194 coupled to vertical or second links 198 (e.g., one horizontal link 194 is coupled between two adjacent vertical links 198) with the flight bars 186 coupled to the horizontal links 194 of the chains 182. The flight bars 186 include ends or fixed portions 202 that are sized to be received within the lower grooves 162 and the upper grooves 170 of the conveyor pan 150. As such, the ends 202 of the flight bars 186 are shaped to match the contour of the lower grooves 162 and the upper grooves 170. In one embodiment, the flight bars 186 may include a cuboid cross sectional profile (e.g., square, rectangular, etc.) as viewed along the longitudinal axes 190. In other embodiments, the flight bars 186 may include an arcuate cross sectional profile (e.g., circular, ellipse, semi-circular, etc.) as viewed along the longitudinal axes 190. In further embodiments, the flight bars 186 may include a different-shaped profile (e.g., polygon, triangular, etc.) as viewed along the longitudinal axes 190.

Figure 7A:
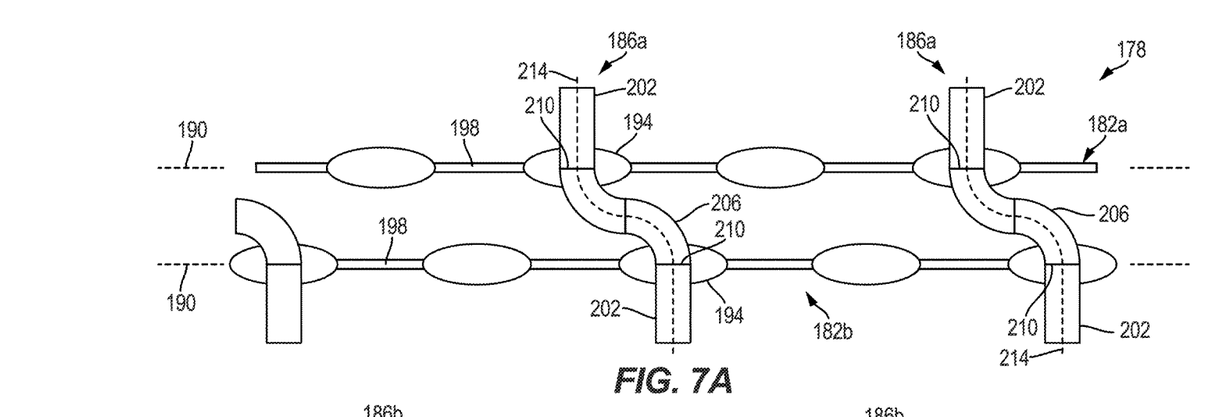
FIG. 7A is a schematic plan view of the portion of the conveyor assembly of FIG. 6 including two chains.

FIGS. 7A-7D illustrate different embodiments of the flight bars 186 coupled to two or three chains 182. With reference to FIG. 7A, each end 202 of the flight bars 186a are fixed (e.g., removably fixed by fasteners) to a horizontal link 194 of one of the two chains 182a, 182b with an intermediate portion 206 of each flight bar 186a pivotally coupled to the ends 202 at movable or pivot joints 210. The intermediate portions 206 extend between the two chains 182a, 182b with the pivot joints 210 enabling the intermediate portion 206 to freely pivot relative to the ends 202. The illustrated flight bars 186a define a curved bar (e.g., two-bend bar, Z-shaped, etc.) having a central axis 214. Portions of the central axis 214 extending through the ends 202 of the flight bars 186a are substantially perpendicular to the longitudinal axes 190, and portions of the central axis 214 extending through the intermediate portion 206 of the flight bars 186a are substantially parallel to the longitudinal axes 190. In other words, a first portion of the central axis 214 that extends through the end 202 coupled to the first chain 182a is perpendicular to the longitudinal axes 190, a second portion of the central axis 214 that extends through the end 202 coupled to the second chain 182b is perpendicular to the longitudinal axes 190, but the first portion of the central axis 214 is offset from the second portion of the central axis 214 in a direction parallel to the longitudinal axes 190. In other embodiments, the flight bars 186a may be flexible members such that the pivot joints 210 may be flexible joints of the flight bars 186a.

Figure 7B:
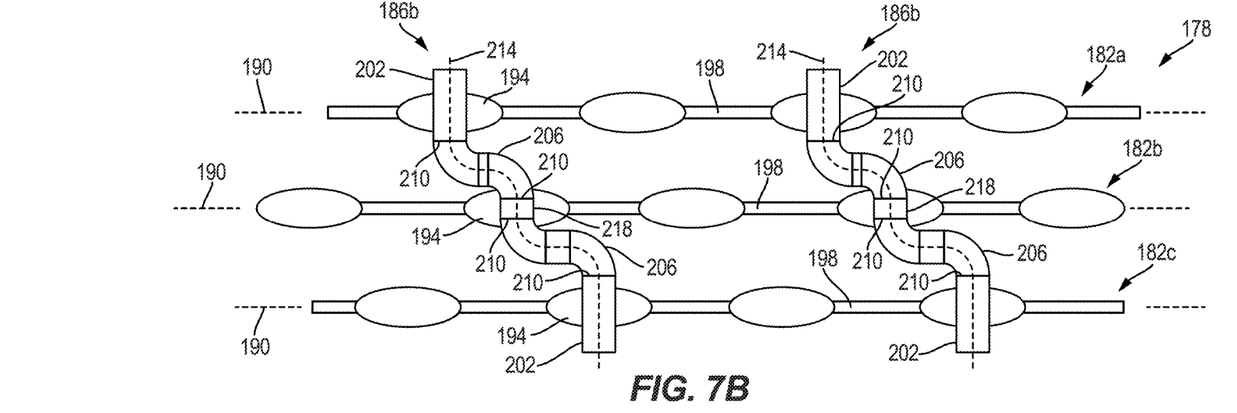
FIG. 7B is a schematic plan view of the portion of the conveyor assembly of FIG. 6 including three chains.

With reference to FIG. 7B, each end 202 of the flight bars 186b (similar to the flight bar 186a) are fixed to a horizontal link 194 of one of the two outer chains 182a, 182c. In addition, a central portion or fixed portion 218 of each flight bar 186b is fixed to a horizontal link 194 of the middle chain 182b. Each intermediate portion 206 of each flight bar 186b is pivotally coupled between one end 202 and the central portion 218 at two pivot joints 210 (e.g., each flight bar 186b includes four pivot joints 210). The central axis 214 of the flight bar 186b also defines a curved bar (e.g., four-bend bar, zig-zag shaped, etc.). Portions of the central axis 214 extending through the ends 202 and the central portion 218 are substantially perpendicular to the longitudinal axes 190, and portions of the central axis 214 extending through the intermediate portions 206 are substantially parallel to the longitudinal axes 190.

Figure 7C:
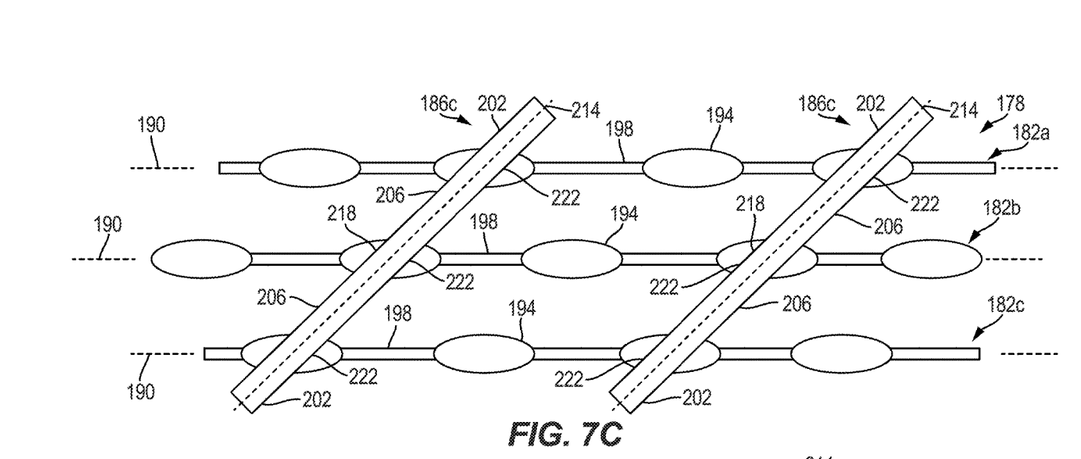
FIG. 7C is a schematic plan view of the portion of the conveyor assembly of FIG. 6 including three chains according to another embodiment.

With reference to FIG. 7C, the ends 202 and the central portions 218 of flight bars 186c (similar to the flight bars 186b) are fixed to the horizontal links 194 by movable joints 222. The movable joints 222 allow movement (e.g., flexing) of the intermediate portions 206 relative to the central portion 218 as well as movement of the intermediate portions 206 relative to the ends 202. In this embodiment, the central axis 214 of each flight bar 186c is linear and oriented at an oblique angle relative to the longitudinal axes 190. In addition, the central axes 214 of the flight bars 186c are oriented parallel to each other.

Figure 7D:
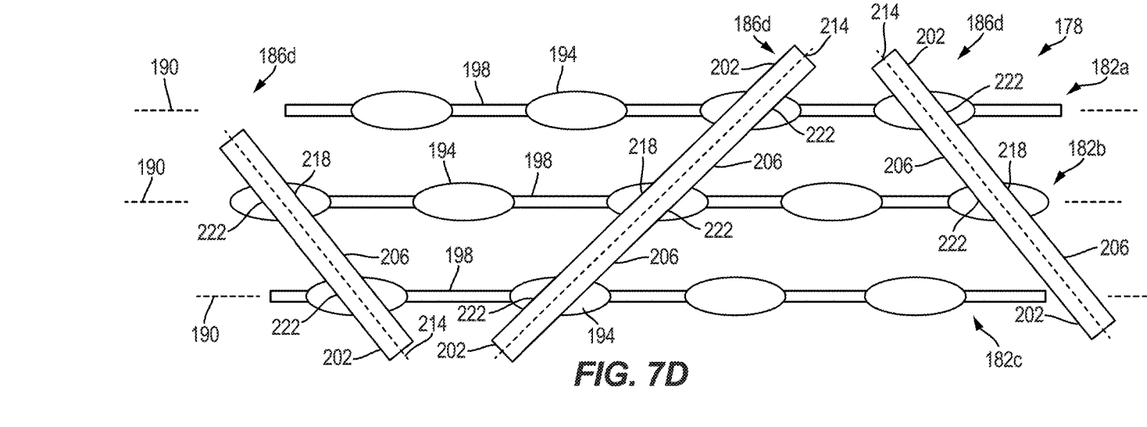
FIG. 7D is a schematic plan view of the portion of the conveyor assembly of FIG. 6 including three chains according to another embodiment.

With reference to FIG. 7D, the central axis 214 of each flight bar 186d is also linear and oriented at an oblique angle relative to the longitudinal axes 190, similar to the flight bars 186c. However, the central axes 214 of adjacent flight bars 186d are obliquely oriented.

Figure 8:
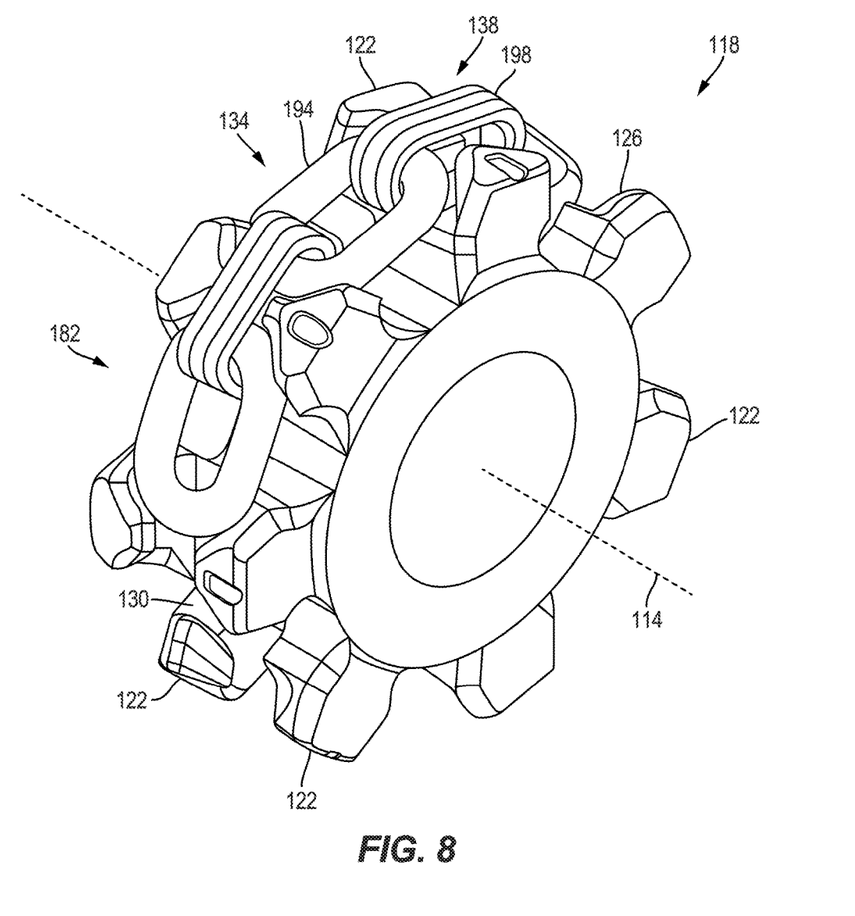
FIG. 8 is a perspective view of a drive sprocket of FIG. 5 and a portion of one chain.

During operation of the longwall mining system, the longwall shearer 10 cuts material from the mine face 34, and the material is ultimately received within the upper channel 166 of the conveyor pan 150. As the longwall shearer 10 cuts into the mine face 34, the drive unit 102 of at least one end frame 98 rotates the plurality of sprockets 118 about the rotational axis 114 (FIG. 4). As best shown in FIG. 4, each sprocket 118 engages one of the chains 182 and moves a portion of the chains 182 through the upper channel 166 in one direction (e.g., the first direction 38) and moves another portion of the chains 182 through the lower channel 158 in the other direction (e.g., the second direction 42). In particular and with reference to FIG. 8, the horizontal links 194 of each chain 182 are received within the first link slot 134 of a respective sprocket 118, and the vertical links 198 of each chain 182 are received within the second link slot 138 of a respective sprocket 118 in order for the sprockets 118 to grip the chains 182 and move the chains 182 relative to the conveyor pan 150.

Because the sprockets 118a-c are angularly offset from each other, each sprocket 118a-c will grip a respective chain 182a-c at a different point in time. For example, the first sprocket 118a will grip a horizontal link 194 of the first chain 182a, then subsequently the second sprocket 118b will grip a horizontal link 194 of the second chain 182b, then subsequently the third sprocket 118c will grip a horizontal link 194 of the third chain 182c, and then the sequence repeats as the sprockets 118a-c rotate about the rotational axis 114. This staggered sequence of gripping the chains 182a evenly distributes the torque load acting against the motor 106 throughout a full rotation of the sprockets 118a-c. If the sprockets 118a-c were not angularly offset, a torque load spike would act against the motor 106 as the sprocket 118a-c simultaneously grip a respective chain 182a-c, which would reduce the working life of the motor 106.

Figure 9:
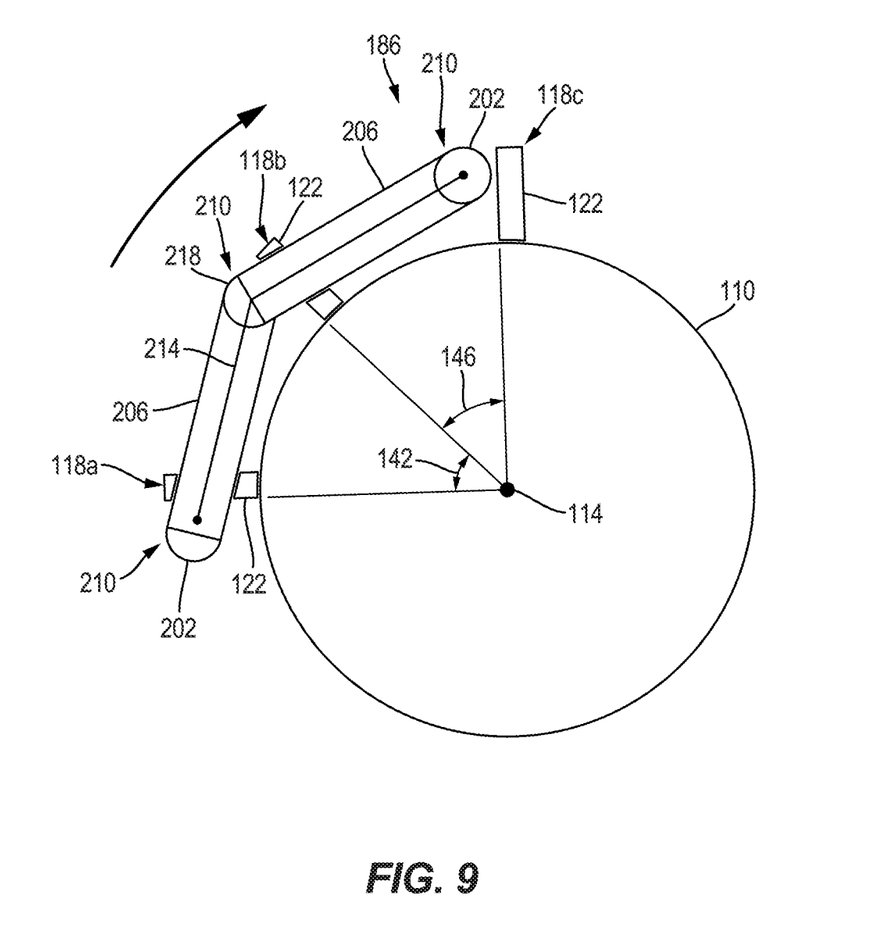
FIG. 9 is a side view of the drive assembly of FIG. 5 illustrating a flight pivoting about the drive shaft.

The illustrated flight bars 186 are able to pivot or flex about the joints 210, 222 in response to the sprockets 118a-c being angularly offset. For example and with reference to FIGS. 7B and 9, as the sprockets 118a-c grip the three chains 182a-c to rotate the chains 182a-c about the rotational axis 114, the flight bars 186b pivot at the pivot joints 210. In particular, the first sprocket 118a begins to rotate the first chain 182a about the rotational axis 114 before the second chain 182b and the third chain 182c begin to rotate about the rotational axis 114. As a result, the end 202 of the flight bar 186b, which is fixed to the first chain 182a, moves relative (e.g., moves vertically; FIG. 4) relative to the central portion 218 and the other end 202. The pivot joint 210 between the central portion 218 and the end 202 fixed to the first chain 182a enables movement between the end 202 and the central portion 218 as the flight bars 186b move around the rotational axis 114. Similar movement occurs between the central portion 218 and the end 202 fixed to the third chain 182c as the second sprocket 118b begins to rotate the second chain 182b before the third sprocket 118c begins to rotate the third chain 182c about the rotational axis 114. Likewise, similar movement occurs with the flight bars 186a illustrated in FIG. 7A as two sprockets 118 rotate the two chains 182a, 182b about the rotational axis 114. Moreover, as the flight bars 186a, 186b begin to move around the rotational axis 114, the central axis 214 of each flight bar 186a, 186b bends about the central portion 218 (FIG. 9). Furthermore, similar movement occurs with the flight bars 186c, 186d illustrated in FIGS. 7C and 7D as three sprockets 118 rotate the three chains 182a, 182b, 182c about the rotational axis 114, but the flight bars 186c, 186d flex relative to the fixed joints 222 rather than pivot about the joints 222.

Referring again to FIG. 4, the flight bars 186 will continue to pivot or flex around the rotational axis 114 until the flight bars 186 reach a half way position in their rotation about the rotational axis 114. Thereafter, the flight bars 186 will pivot or flex back into a generally planar flight bar configuration so that when the conveying element 178 disengages from the sprockets 118, the flight bars 186 move along the support plate 154 of the conveyor pan 150 (FIG. 4). Consequently, the flight bars 186 can push the cut material that has been received within the upper channel 166 along the longitudinal axes 190 (e.g., the first direction 38) in order for the cut material to be transported relative to the mine face 34.

Although certain aspects have been described in detail with reference to certain preferred embodiments, variations and modifications exist within the scope and spirit of one or more independent aspects as described. Various features and advantages are set forth in the following claims.

What is claimed is:

1. A conveyor system configured to move material relative to a mine face, the conveyor system comprising:
   a conveyor pan configured to support the material;
   a drive unit including a drive shaft and a plurality of sprockets secured to the drive shaft, the drive shaft driven about a rotational axis; and
   a conveying element including a plurality of chains and a plurality of flights, each of the chains driven by one of the sprockets to move the chain and the flights over the conveyor pan, each of the flights coupled between the plurality of chains, each of the plurality of flights including a first portion and a second portion, the first portion coupled to the second portion by a movable joint, the flights configured to move the material over the conveyor pan;
   wherein the plurality of sprockets are angularly offset about the rotational axis relative to each other, and wherein the first portion moves relative to the second portion at the movable joint in response to the plurality of chains engaging the plurality of sprockets and moving about the rotational axis.

2. The conveyor assembly of claim 1, wherein each flight includes a central axis extending between a first end and a second end of each flight, and wherein the central axis includes at least one curved portion.

3. The conveyor assembly of claim 2, wherein each chain defines a longitudinal axis, and wherein at least one portion of the central axis is substantially perpendicular to the longitudinal axis of each chain, and wherein another portion of the central axis is substantially parallel to the longitudinal axis of each chain.

4. The conveyor assembly of claim 1, wherein each chain includes a plurality of horizontal links and a plurality of vertical links, and wherein the first portion of each flight is fixedly coupled to one of the horizontal links, and wherein the second portion of each flight is an intermediate portion extending between two adjacent chains.

5. The conveyor assembly of claim 4, wherein each flight includes two fixed portions, each fixedly coupled to one of the chains, and wherein the intermediate portion is pivotably coupled between the two fixed portions.

6. The conveyor assembly of claim 5, wherein the plurality of chains includes three chains, and wherein each flight includes three fixed portions, each of the three fixed portions secured to one of the three chains, and wherein each flight includes two intermediate portions, each of the intermediate portions pivotably coupled between two of the three fixed portions.

7. A conveyor assembly for moving material, the conveyor assembly comprising:
at least two chains configured to be driven by a sprocket that is rotatable about a sprocket axis; and
a plurality of flights, each of the plurality of flights including a first portion coupled to a second portion by a movable joint, the first portion fixedly coupled to one of the at least two chains, the second portion extending between the at least two chains, each flight of the plurality of flights configured to contact and move the material, the first portion moving relative to the second portion as the flight is driven about the sprocket axis.

8. The conveyor assembly of claim 7, wherein each flight includes a central axis extending between a first end and a second end of each flight, and wherein the central axis includes at least one curved portion.

9. The conveyor assembly of claim 8, wherein each chain defines a longitudinal axis, and wherein one portion of the central axis is substantially perpendicular to the longitudinal axis of each chain, and wherein another portion of the central axis is substantially parallel to the longitudinal axis of each chain.

10. The conveyor assembly of claim 7, wherein each chain includes a plurality of horizontal links and a plurality of vertical links, and wherein the first portion of each flight is fixedly coupled to one of the horizontal links, and the second portion of each flight is an intermediate portion extending between the at least two chains.

11. The conveyor assembly of claim 10, wherein each flight includes two fixed portions, each fixed portion fixedly coupled to one of the at least two chains, and wherein the intermediate portion is pivotably coupled between the two fixed portions.

12. The conveyor assembly of claim 11, wherein the at least two chains includes three chains, and wherein each flight includes three fixed portions, each of the three fixed portions secured to one of the three chains, and wherein each flight includes two intermediate portions, each of the intermediate portions pivotably coupled between two of the three fixed portions.

13. A conveyor assembly for moving material, the conveyor assembly comprising:
at least two chains, the at least two chains driven along a path including a carry run and a return run; and
a plurality of flights coupled to the at least two chains for movement along the path, the flights configured to contact and move the material along the carry run in a first direction, the flights moving in a second direction along the return run, each of the plurality of flights extending along a central axis oriented obliquely with respect to the first direction;
wherein the central axis of each of the plurality of flights is configured to bend in response to each of the plurality of flights transitioning between the carry run and the return run.

14. The conveyor assembly of claim 13, wherein each flight includes a first portion offset from a second portion in the first direction parallel to a longitudinal axis of each chain, and wherein the first portion and the second portion are both oriented substantially perpendicular to the longitudinal axis of each chain.

15. The conveyor assembly of claim 14, wherein the first portion is coupled to the second portion by a movable joint.

16. The conveyor assembly of claim 13, wherein each flight includes a first end positioned distal to a second end along the central axis, and wherein the first and second ends of each flight move relative to each other in response to each flight transitioning between the carry run and the return run.

17. The conveyor assembly of claim 13, wherein each flight includes two curved portions.

18. The conveyor assembly of claim 17, wherein the two curved portions are located between the at least two chains.

19. The conveyor assembly of claim 13, wherein the at least two chains includes three chains, and wherein each flight includes four curved portions.

20. The conveyor assembly of claim 19, wherein two of the four curved portions are located between the first chain and the second chain, and wherein the other two of the four curved portions are located between the second chain and the third chain.

21. The conveyor assembly of claim 14, wherein each flight includes a third portion substantially parallel to the longitudinal axis of each chain.

* * * * *